United States Patent Office 3,705,107
Patented Dec. 5, 1972

3,705,107
OIL BASE GEL HAVING LOW VISCOSITY BEFORE GELATION AND METHOD OF PRODUCING SAME
Raymond W. Hoeppel, P.O. Box 997,
Oak View, Calif. 93022
No Drawing. Filed Nov. 6, 1970, Ser. No. 87,649
Int. Cl. B01j 13/00; H01b 3/02
U.S. Cl. 252—316         3 Claims

ABSTRACT OF THE DISCLOSURE

A thixotropic oil base gel having a low dielectric constant and high electrical resistivity is produced by agitating together in oil an alkali metal soap of a disproportionated rosin acid, a calcium base and an oil dispersible hydroxy hydrocarbon surfactant selected from a group comprising phenols and alcohols. Because of retarded gelation, the resultant fluid is low in viscosity and can be easily pumped into confined areas where it sets up to a stable rigid gel upon cessation of agitation.

---

This invention relates to the production of an oil base rigid gel having excellent electrical properties as an insulator as well as excellent water resistance and heat insulation properties. The gel is particularly well suited for the filling of voids in electrical conduit but also may be used for waterproofing, as a heat insulating medium, or for corrosion protection and the like.

Heretofore oil base gels often required high pump pressure to move them into place. This was largely because of the fast gelation rate which caused a rapid rise in apparent viscosity very soon after reacting the ingredients to form the gel, or because high viscosity oils were needed in the formulation. It would thus be very difficult to inject such a gel into a long narrow conduit. Some gel systems required heating the ingredients to facilitate gel formation and to improve mobility during placement. Other systems required the addition of large amounts of finely divided solids or appreciable quantities of water to aid in gel development, with the result that the dielectric constant was raised and the mobility of the fluid before gelation was lessened. Other gel systems were unstable in that the gels tended to deteriorate with age. Also serious syneresis occurred in many of these systems.

It is the object of this invention to overcome all of these above deficiencies. This is accomplished by reacting in an oil base an alkali metal soap of a disproportionated rosin acid with a calcium base in the presence of a small amount of an oil dispersible hydroxy hydrocarbon surfactant, selected from a group comprising aliphatic alcohols, cyclohexanone and monohydric phenols. Agitation is necessary to promote the reaction. If a low viscosity oil is used, the apparent viscosity of the fluid will remain low during agitation. Upon cessation of agitation the fluid will set up to a firm stable gel even at room temperature, which will not deteriorate with age and which will be free from syneresis. Because of the absence of appreciable amounts of water or solids in the system, the resultant gel has a low dielectric constant and high electrical resistivity, and is thus well suited for the insulation of electrical wires in conduit.

In this invention any type of oil may be used, but it is preferred to use a low viscosity mineral oil, such as diesel or light fuel oils, especially where the gel is to be produced inside a long conduit and where ease of transporting the gel to its final location is a requirement.

A preferred disproportionated rosin acid soap for use in this invention may be produced by heating gum or wood rosin at temperatures of 150 to 300 degrees centigrade in the presence of a hydrogenation catalyst and in the absence of added hydrogen, distilling the reacted product under 5 to 10 mm. pressure, and reacting a middle cut of the distillate with sodium hydroxide solution to form the sodium soap. Such product is sold under the trade name Dresinate 731 by the Hercules Corporation. It normally contains a small amount of water to impart fluidity, this water sufficing to provide the necessary water required for the reaction to form the gel. Satisfactory disproportionated rosin acids useful in this invention contain 40 percent or more of dehydroabietic acid. Details concening production of disproportionated rosin acids suitable for producing the soaps used in this invention appear in U.S. 2,154,629 and U.S. 2,485,616.

The rosin soap concentration in the gel may vary from 1 to 8 percent, depending upon the required rigidity of gel. The amount used also will be somewhat dependent upon the type of oil used. Larger amounts produce more rigid gels.

The calcium base should be present in an amount at least stoichiometrically equivalent to the amount of soap present, and preferably some excess should be present. However, large excesses of the calcium base will result in a weakened gel. Suitable calcium bases include slacked and unslacked lime.

The oil dispersible surfactant should be present in amounts varying from 0.02 to 2 percent. This surfactant may be selected from a group comprising aliphatic alcohols, cyclohexanol and monohydric phenols. Alcohols that are not oil dispersible, such as ethanol, are of little value. In general the halogenated and nitrated phenols are not as effective as phenol and the alkyl phenols. Both saturated and unsaturated aliphatic alcohols may be used. In general, the phenols are more effective in improving the gel than the alcohols, but larger amounts are required especially when the molecular weight is high. The use of too much surfactant may result in a weaker gel and may lend towards gel instability.

The addition of finely divided oil insoluble solids to the fluid before gelation will usually result in a more rigid gel but will also raise the dielectric constant. However, where good electrical properties are not required, the use of from 0.1 to 30 percent of finely divided solids will enable economies in the amount of the rosin soap required. Suitable solids include, diatomaceous earth, silica flour, asbestos, clays, barite, limestone and the like.

The ingredients may be mixed in any order, but it is preferred to add the calcium base and any solids last. After the ingredients to form the calcium soap are present in the oil, the fluid mixture is agitated to effect a reaction and it is preferred to maintain agitation until the fluid is moved to the final location where gelation is desired. Then upon cessation of agitation, the fluid will with in a short time set up to a gelled condition and will continue to improve in gel strength on aging. If the fluidic mixture is not maintained in constant agitation before placement, the eventual gel strength will be somewhat weaker because of gelation during the pause in agitation and re-breaking of this gel on later agitation. The mere movement of the fluid through a conduit serves to agitate it sufficiently to repress gelation.

Where a low density fluid is desired, such as for heat insulation, a gas such as air may be injected into the agitated fluid just as the first signs of gelation appear. This can be effectively done by passing the fluid through a Venturi. Once sufficient gelation has occurred the air will remain entrapped in the gel in finely divided bubbles, which serve to lessen the apparent density and lessen the heat conductivity of the fluid and, of course, reduce the cost per unit volume. At this point, the fluid may be moved into place without losing the air bubbles, and will then set into an aerated gel when quiescent.

Excessive water, greater than about 3 to 4 percent, should be avoided as it will increase the initial gelation rate making the apparent viscosity high even under agitation, will weaken the eventual gel developed under quiescent conditions, and will increase the dielectric constant.

To demonstrate the merits of this invention, a number of experiments were performed in which gels were produced in refined diesel oils. In all of these tests the rosin soap used was Dresinate 731, previously described, and the calcium base was calcium oxide. All ingredients were added to the oil which was then stirred for five minutes at room temperature to promote the reaction, after which the oil base fluids were aged at room temperature under quiescent conditions. After standing 18 hours the firmness of any gel produced was evaluted by probing with a spatula, assigning index numbers from 1 to 7 to indicate the degree of firmness of the gels. To correlate these numbers with the actual shear strength, numerous gels of differing rigidity were evaluated both by probe and by the Bariod Shearometer in accordance with standard API procedure, and a range of shear strength was established for each degree of firmness. Where gels were firmer, additional weight was added to the shearometer tube and true readings were obtained by multiplying the reading by a factor relater to the additional weight. Results of the correlation between these gel index numbers and actual shear strength appear in the following table.

TABLE I

| Gel firmness index: | Shear strength, lbs./100 sq. ft. |
|---|---|
| Liquid | 0–6 |
| 1 | 6–15 |
| 2 | 15–25 |
| 3 | 25–40 |
| 4 | 40–100 |
| 5 | 100–180 |
| 6 | 180–300 |
| 7 | 300–600 |

EXAMPLE 1

Gelled fluids were prepared as above in 35 degree API diesel fuel, each containing 3 percent of Dresinate 731 and 1.2% lime. In addition small amounts of various phenols were added to improve the gelation. Results follow.

| Test No. | Phenol added Percent | Type | After standing 18 hours at room temperature Syneresis | Gel index | Settling |
|---|---|---|---|---|---|
| 1 | 0 | | 0 | Liquid | 0 |
| 2 | 0.4 | Mixed xylenols [1] | 0 | 2 | 0 |
| 3 | 0.6 | do.[1] | 0 | 5 | 0 |
| 4 | 0.7 | Dinitrophenol | 0 | 1 | 0 |
| 5 | 0.7 | p-Chlorophenol | 0 | 1 | 0 |
| 6 | 0.6 | Phenol | 0 | 5 | 0 |
| 7 | 0.4 | Nonyl phenol | 0 | 4 | 0 |
| 8 | 0.6 | do | 0 | 5 | 0 |
| 9 | 0.8 | do | 0 | 5 | 0 |

[1] Mainly 3–5 and 2–3 xylenols.

Unless a phenol was present no gel developed. The chloro and nitro phenols were not as effective in these tests as the other phenols in improving gelation.

EXAMPLE 2

Gelled fluids were prepared in 35 degree API diesel fuel, each containing 4% Dresinate 731 and 1.2% lime. In addition most of these gels were treated during make-up with various surfactants as shown and in some instances, finely divided solids were added. Results are shown in the following table.

| Test No. | Surfactant added Percent | Type | Filler added Percent | Type | After standing 18 hours at room temperature Syneresis | Gel index | Settling |
|---|---|---|---|---|---|---|---|
| 1 | 0 | | 0 | | Slight | Liquid | 0 |
| 2 | 0 | | 2 | Diatom. earth | do | Liquid [1] | 0 |
| 3 | 0 | | 2 | Asbestos | 0 | do.[1] | 0 |
| 4 | 0.32 | Cyclohexanol | 0 | | 0 | 2 | 0 |
| 5 | 0.40 | do | 2 | Diatom. earth | 0 | 6 | 0 |
| 6 | 0.4 | do | 2 | Bentonite | 0 | 6 | Slight |
| 7 | 0.8 | Octylphenol | 0 | | 0 | 7 | 0 |
| 8 | 0.6 | Nonylphenol | 0 | | 0 | 7 | Slight |
| 9 | 0.24 | Crotyl alcohol | 0 | | 0 | 2 | 0 |
| 10 | 0.24 / 0.24 | Crotyl alcohol / Cyclohexanol | 0 | | 0 | 6 | 0 |
| 11 | 0.20 | Oleyl alcohol | 0 | | 0 | 1 | 0 |
| 12 | 0.20 | do | 2 | Diatom. earth | 0 | 5 | 0 |
| 13 | 0.28 | do | 2 | Bentonite | 0 | 4 | 0 |

[1] Slightly more gel than in Test 1.

In these tests, although more soap was present than in the previous tests, still no gelation occurred unless phenols or alcohols were present. Although diatomaceous earth or bentonite did not appreciably improve gelation in the absence of these surfactants, it did markedly improve the gels where surfactants were present. On aging 90 days at room temperature all gels either improved or remained the same.

EXAMPLE 3

Oil base gels were prepared in 31 degree API diesel fuel, wherein 4 percent of Dresinate 731 soap and 1.2 percent lime was present. The effects of various alcohols and phenols on these gels was studied. Results appear in the table below.

| Test No. | Alcohol Percent | Type | After aging 18 hours at room temperature Syneresis | Gel index | Settling |
|---|---|---|---|---|---|
| 1 | 0 | | ([1]) | Liquid | 0 |
| 2 | 0.4 | Cetyl alcohol | ([1]) | 2 | 0 |
| 3 | 0.4 | Lauryl alcohol | ([1]) | 3 | 0 |
| 4 | 0.2 / 0.15 | Nonyl phenol / Cyclohexanol | 0 | 4 | 0 |

[1] Slight.

Again, alcohols produced gelation while the fluid remained liquid without the alcohol. A mixture of cyclohexanol and nonyl phenol also produced a good gel.

What is claimed is:

1. A method of producing a gelled, thixotropic oil and transferring said oil to a permanent location while it is still fluid comprising the steps of adding to an oil base from 1 to 8 percent of an alkali metal soap of a disproportionated rosin acid, a calcium base in an amount at least stoichiometrically equivalent to said soap and from 0.02 to 2 percent of an oil dispersible hydroxy hydrocarbon surfactant selected from a group consisting of monohydric phenols, aliphatic alcohols and cyclohexanol; briefly agitating the resultant fluid to promote a chemical reaction between said soap and calcium base, and then, after reaction has begun, transferring said fluid to said permanent location and thereafter allowing said fluid to remain in a quiescent state, whereupon said fluid is transformed into a stable, water resistant, thixotropic gel having a low dielectric constant and high electrical resistivity.

2. A method according to claim 1 wherein from 0.1 to 30 percent of finely divided oil insoluble solids are added to the fluid before gelation.

3. A gelled thixotropic composition having a low dielectric constant and high electrical resistivity comprising an oil containing a gellant produced by reacting in oil 1 to 8 percent of an alkali metal soap of a disproportionated rosin acid with a calcium base in an amount at least stoichiometrically equivalent to said soap in the presence of from 0.02 to 2 percent of an oil dispersible hydroxy hydrocarbon selected from a group consisting of monohydric phenols, aliphatic alcohols and cyclohexanol.

References Cited

UNITED STATES PATENTS

| | | | |
|---|---|---|---|
| 2,505,222 | 4/1950 | Weitkamp et al. | 252—39 |
| 2,866,754 | 12/1958 | Cardwell et al. | 252—316 X |
| 3,334,052 | 8/1967 | Kurz et al. | 252—316 |

RICHARD D. LOVERING, Primary Examiner

U.S. Cl. X.R.

106—14, 239; 252—8.55 R, 63, 63.5; 302—66